(12) United States Patent
Naouri et al.

(10) Patent No.: US 9,746,899 B2
(45) Date of Patent: Aug. 29, 2017

(54) AT LEAST ONE MESSAGE TO ANNOUNCE ENTRY INTO RELATIVELY LOWER POWER STATE

(75) Inventors: Ygdal Naouri, Jerusalem (IL); Ben-Zion Friedman, Jerusalem (IL); Eliezer Tamir, Jerusalem (IL); Eliel Louzoun, Jerusalem (IL); Ilango Ganga, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 13/814,893

(22) PCT Filed: Mar. 16, 2012

(86) PCT No.: PCT/US2012/029316
§ 371 (c)(1),
(2), (4) Date: Feb. 7, 2013

(87) PCT Pub. No.: WO2013/137896
PCT Pub. Date: Sep. 19, 2013

(65) Prior Publication Data
US 2013/0246828 A1 Sep. 19, 2013

(51) Int. Cl.
*G06F 1/32* (2006.01)
(52) U.S. Cl.
CPC .................. *G06F 1/3209* (2013.01)
(58) Field of Classification Search
CPC ..... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS 7,447,757 B2 * 11/2008 Muto .................. G06F 1/3203
709/203
7,454,634 B1 * 11/2008 Donovan ............ H04W 52/029
713/322

(Continued)

FOREIGN PATENT DOCUMENTS

WO 2011159985 A1 12/2011
WO 2013/137896 A1 9/2013

OTHER PUBLICATIONS

Reich et al., Sleepless in Seattle No Longer, Columbia University, Microsoft Research, Jun. 22, 2010.*

(Continued)

*Primary Examiner* — Chun Cao
*Assistant Examiner* — Mohammad A Rahman
(74) *Attorney, Agent, or Firm* — Christopher K. Gagne

(57) ABSTRACT

An embodiment may include circuitry that may be capable of performing operations that may include generating, at least in part, at least one message to announce that at least one network node (1) is requesting, at least in part, that one or more transmissions to the at least one network node be postponed, at least in part, and/or (2) is entering, at least in part after issuance of the at least one message, a relatively lower power state relative to a relatively higher power state. Additionally or alternatively, the operations may include, in response, at least in part, to the at least one message, postponing, at least in part, at least one intermediate node at least one transmission (received by the at least one intermediate node) to the at least one network node. Many alternatives, variations, and/or modifications are possible without departing from this embodiment.

29 Claims, 6 Drawing Sheets

(56) References Cited

U.S. PATENT DOCUMENTS

| | | | |
|---|---|---|---|
| 7,552,246 B2 | 6/2009 | Mahany et al. | |
| 7,881,755 B1* | 2/2011 | Mishra | H04W 52/0229 455/574 |
| 2005/0138451 A1* | 6/2005 | Simpson | H04W 52/0225 713/320 |
| 2008/0291855 A1 | 11/2008 | Bata et al. | |
| 2010/0008278 A1* | 1/2010 | Kone | H04W 52/0216 370/311 |
| 2010/0042691 A1 | 2/2010 | Maguire et al. | |
| 2010/0195552 A1 | 8/2010 | Ho | |
| 2010/0235666 A1* | 9/2010 | Fan | G06F 1/3209 713/323 |
| 2012/0151028 A1* | 6/2012 | Lu | H04W 4/18 709/223 |

OTHER PUBLICATIONS

International Search Report and Written Opinion received for PCT Application No. PCT/US2012/029316, mailed on Oct. 23, 2012. 14 pages.

"Energy-Efficient Ethernet," Wikipedia, http://en.wikipedia.org/wiki/IEEE_802.3az, retrieved Mar. 5, 2012, 6 pages.

Wertheimer et al., "Capabilities Negotiation Proposal for Energy-Efficient Ethernet," IEEE 802.3az Munich Meeting, May 2008, 18 pages.

Deuskar et al., "Platform Power Management," T11/11-143v0, 22 pages.

"Cloud Computing," Wikipedia, http://en.wikipedia.org/wiki/Cloud_computing, retrieved Oct. 5, 2011, 11 pages.

Section 6.18, Latency Tolerance Reporting (LTR) Mechanism, PCI Express Base Specification, Rev. 3.0, PCI Special Interest Group, Nov. 2010, 11 pages.

"Platform as a service," Wikipedia, http://en.wikipedia.org/wiki/Platform_as_a_service, retrieved Oct. 5, 2011, 3 pages.

"Software as a service," Wikipedia, http://en.wikipedia.org/wiki/Software_as_a_service, retrieved Oct. 5, 2011, 5 pages.

International Preliminary Report on Patentability and Written Opinion received for PCT Patent Application No. PCT/US2012/029316, mailed on Sep. 25, 2014, 6 pages.

Office Action dated Jul. 4, 2016 in Chinese Patent Application No. 201280071428.4, and related attachments (8 pages).

Office Action dated Jun. 2, 2017 in Chinese Patent Application No. 201280071428.4, and related attachments.

* cited by examiner

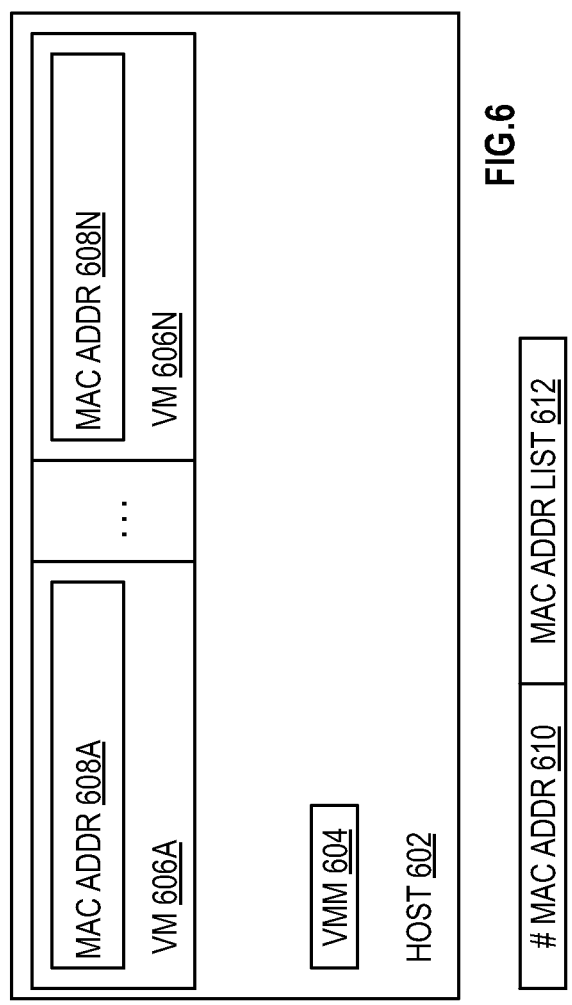

AT LEAST ONE MESSAGE TO ANNOUNCE ENTRY INTO RELATIVELY LOWER POWER STATE

FIELD

This disclosure relates to generating, at least in part, and/or receiving, at least in part, of at least one message that announces the entrance into a relatively lower power state from a relatively higher power state.

BACKGROUND

In one conventional arrangement, a network includes a platform that can send and receive messages to and from one or more other nodes. In order to reduce power consumption, the platform is capable of entering a reduced power state (e.g., relative to its fully operational power state). When the platform is in a reduced power state, the device buffers received data for later processing after the platform has returned to its fully operational power state.

In accordance with a conventional optimized buffer flush/fill (OBFF) technique, prior to entering its reduced power state, the device indicates within the platform the maximum amount of time that the device is able to remain in its reduced power state before it might lose data as a result of buffer overflow. After providing such indication, if the platform becomes idle, the platform enters a reduced power state whose characteristics (e.g., duration and degree of power reduction) are selected to accommodate the indicated maximum amount of time.

In this conventional scheme, the indication of the maximum amount of time that the device is able to remain in the reduced power state without losing data is communicated solely within the platform itself. In this conventional scheme, no communication and/or coordination of entry into and/or exit from such reduced power states, and/or of related information, is carried out between the platform and any of the other nodes in the network.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 6 illustrates embodiment features.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
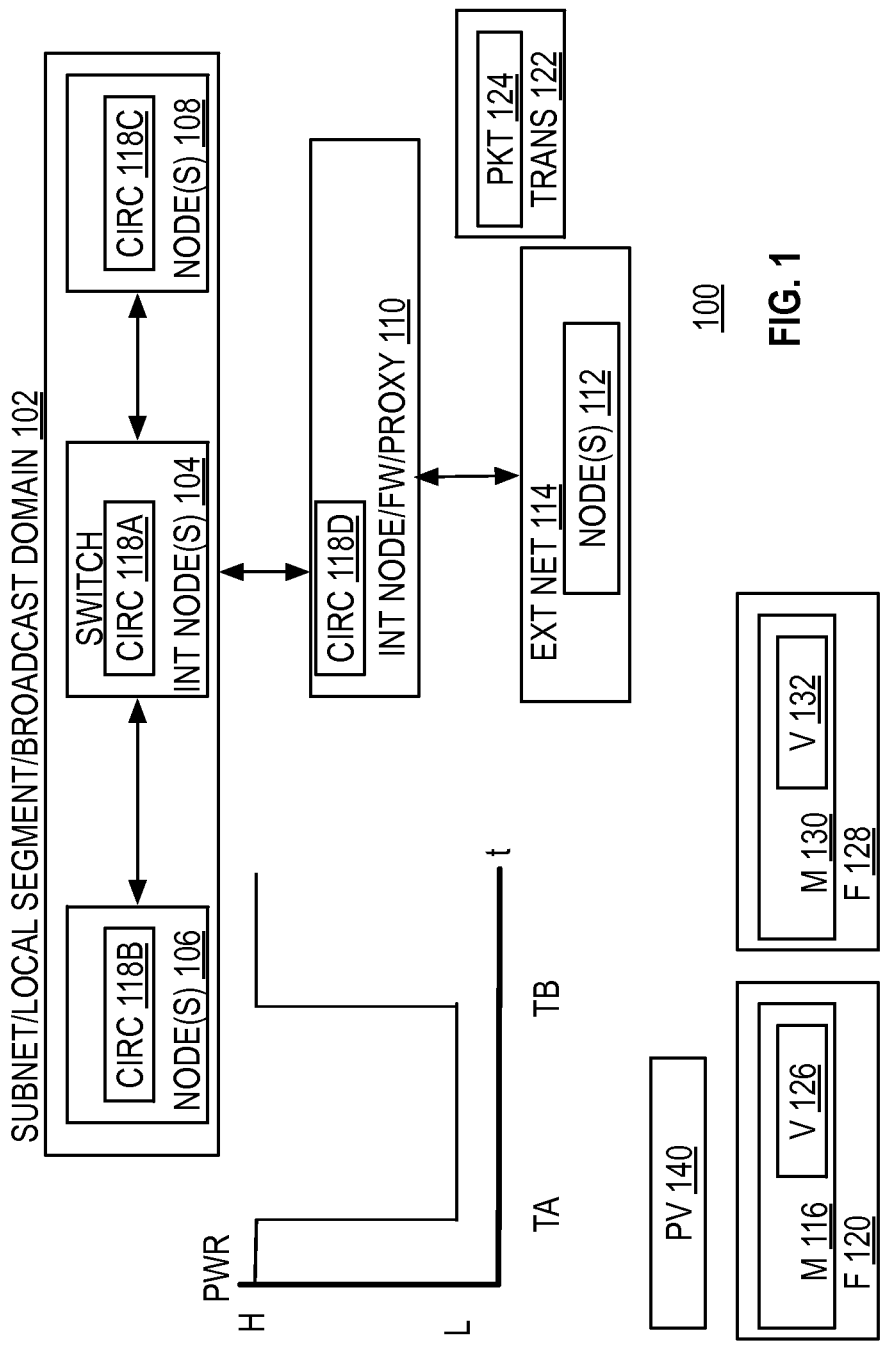
FIG. 1 illustrates a system embodiment.

FIG. 1 illustrates a system embodiment 100. System 100 may be or comprise a network that may comprise, for example, one or more intermediate nodes 110 that may be communicatively coupled to one or more local network segments, broadcast domains, and/or subnets (collectively and/or singly referred to herein by reference numeral 102) and/or to one or more external networks 114. One or more external networks 114 may comprise one or more network nodes 112 that may be communicatively coupled to one or more intermediate nodes 110. One or more subnets 102 may comprise one or more intermediate nodes 104 that may be communicatively coupled to one or more intermediate nodes 110, one or more network nodes 106, and/or one or more network nodes 108.

One or more intermediate nodes 104 may be or comprise one or more switches. One or more intermediate nodes 110 may be or comprise one or more network appliances and/or services running in one or more nodes that may permit these one or more intermediate nodes 110 to be, comprise, or function as, one or more firewall, load balancing, gateway, security service-providing, and/or proxy nodes. In this embodiment, nodes 106, 104, 108, and/or 110 may comprise, at least in part, circuitry 118B, 118A, 118C, and/or 118D, respectively.

In this embodiment, the terms "host computer," "host," "server," "client," "network node," and "node" may be used interchangeably, and may mean, for example, without limitation, one or more end stations, mobile internet devices, smart phones, media devices, I/O devices, tablet computers, appliances, intermediate stations, network interfaces, clients, servers, and/or portions thereof. In this embodiment, an intermediate node may be or comprise one or more nodes that are communicatively coupled directly or indirectly to one or more end nodes. In this embodiment, a network may be or comprise any mechanism, instrumentality, modality, and/or portion thereof that permits, facilitates, and/or allows, at least in part, two or more entities to be communicatively coupled together. In this embodiment, a subnet, local segment, and/or subnetwork may be or comprise one or more portions of at least one network, such as, for example, an Ethernet protocol local area network (LAN) segment and/or an Internet Protocol (IP) subnet. In this embodiment, a broadcast domain may be or comprise one or more subnets that comprise nodes that are amenable to being addressed (e.g., using one or more multicast and/or broadcast messages) via one or more multicast and/or broadcast addresses (e.g., one or more medium access control (MAC) broadcast addresses). In this embodiment, a packet, frame, and/or message may be or comprise one or more symbols and/or values. Also in this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an instruction may include data and/or one or more commands. In this embodiment, a communication link may be or comprise any mechanism that is capable of and/or permits, at least in part, at least two entities to be or to become communicatively coupled.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, host processor, central processing unit, processor core, core, and controller each may comprise respective circuitry capable of performing, at least in part, one or more arithmetic and/or logical operations, and/or of executing, at least in part, one or more instructions. In this embodiment, memory, cache, and cache memory each may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In this embodiment, a portion or subset of an entity may comprise all or less than all of the entity. In this embodiment, a set may comprise one or more elements. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions.

Additionally, in this embodiment, a switch may be or comprise one or more intermediate nodes comprising circuitry that is capable, at least in part, of receiving, at least in part, one or more packets from one or more nodes, and of transmitting, at least in part, the received one or more packets to one or more other nodes, for example, via one or more hops in and/or towards one or more ultimate and/or intermediate destinations of the one or more packets. In this embodiment, a firewall node may be or comprise one or more intermediate nodes (e.g., one or more switches) that may be capable of selectively permitting and/or denying transmission of one or more received packets, based at least in part upon one or more parameters. In this embodiment, a proxy node may be or comprise one or more intermediate nodes that are capable, at least in part, of acting as intermediary for one or more requests from one or more other nodes seeking resources and/or services.

In this embodiment, nodes 106, 104, 108, 110, and/or 112 (and/or circuitry 118B, 118A, 118C, and/or 118D respectively comprised in these nodes) may exchange data and/or commands in accordance with one or more communication protocols. For example, in this embodiment, these one or more protocols may be compatible with, at least in part, e.g., one or more Ethernet, Transmission Control Protocol/Internet Protocol (TCP/IP), and/or other protocols.

For example, one or more Ethernet protocols that may be utilized in system 100 may comply or be compatible with, at least in part, IEEE Std. 802.3-2008, Dec. 26, 2008; IEEE Std. 802.1Q-2005, May 19, 2006; IEEE Std. 802.11a-1999, Feb. 11, 1999; IEEE Std. 802.11b-1999, Feb. 11, 1999; IEEE 802.11g-2003, Oct. 20, 2003; and/or IEEE 802.11n-2009, Oct. 29, 2009. The TCP/IP protocol that may be utilized in system 100 may comply or be compatible with, at least in part, the protocols described in Internet Engineering Task Force (IETF) Request For Comments (RFC) 791 and 793, published September 1981. Many different, additional, and/or other protocols (including, for example, those stated above) may be used for such data and/or command exchange without departing from this embodiment (e.g., earlier and/or later-developed versions of the aforesaid, related, and/or other protocols).

Figure 2:
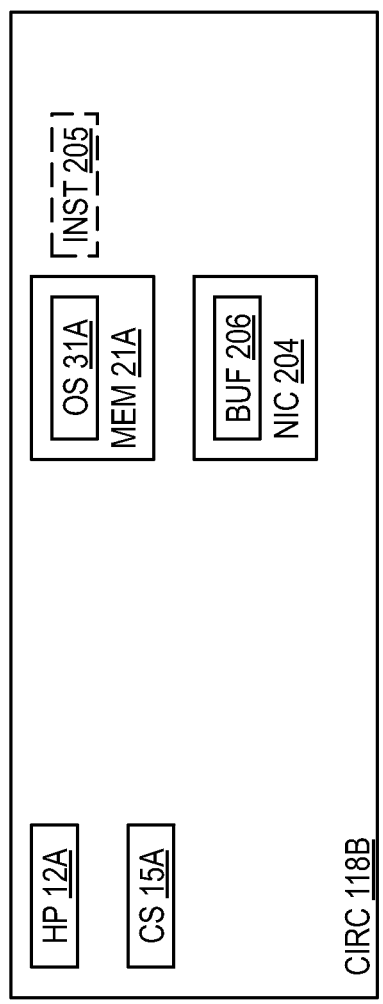
FIG. 2 illustrates embodiment features.

Circuitry 118A, 118B, 118C, and/or 118D may have respectively similar or identical constructions, components, and/or functionalities, at least in part, and/or may be capable of performing similar or identical respective operations, at least in part. For example, as shown in FIG. 2, circuitry 118B may comprise one or more host processors 12A, one or more chipsets 15A, memory 21A, and/or network interface controller (MC) 204. One or more host processors 12A may be communicatively coupled, at least in part, via one or more chipsets 15A to memory 21A and/or NIC 204. In this embodiment, one or more chipsets 15A may be or comprise one or more hub and/or interconnect systems. NIC 204 may comprise buffer memory 206.

Circuitry 118B, one or more host processors 12A, one or more chipsets 15A, memory 21A, and/or NIC 204 may store, at least in part, one or more machine-readable and executable program instructions 205. In operation of network 100, circuitry 118B, and/or one or more nodes 106, these instructions 205 may be accessed and executed by, for example, circuitry 118B, one or more host processors 12A, one or more chipsets 15A, memory 21A, and/or NIC 204. When so accessed and executed, these one or more machine-readable instructions may result in performance of the operations that are described herein as being performed in and/or by circuitry 118B, the components of circuitry 118B, and/or one or more nodes 106. Also, when so accessed and executed, this may result, at least in part, in one or more operating systems (OS) 31A becoming resident in memory 21A and/or being executed, at least in part, by one or more host processors 12A.

Figure 3:
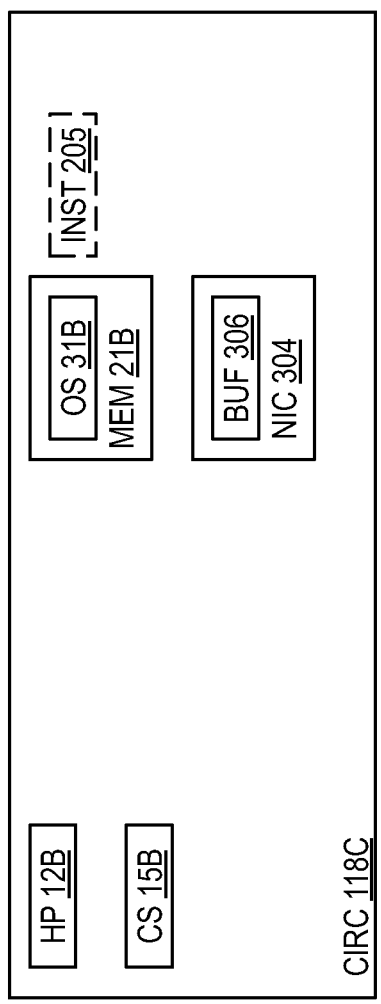
FIG. 3 illustrates embodiment features.

Also, for example, as shown in FIG. 3, circuitry 118C may comprise one or more host processors 12B, one or more chipsets 15B, memory 21B, and/or network interface controller (NIC) 304. One or more host processors 12B may be communicatively coupled, at least in part, via one or more chipsets 15B to memory 21B and/or NIC 304. In this embodiment, one or more chipsets 15B may be or comprise one or more hub and/or interconnect systems. NIC 304 may comprise buffer memory 306.

Circuitry 118C, one or more host processors 12B, one or more chipsets 15B, memory 21B, and/or NIC 304 may store, at least in part, one or more machine-readable and executable program instructions 205. In operation of network 100, circuitry 118C, and/or one or more nodes 108, these instructions 205 may be accessed and executed by, for example, circuitry 118C, one or more host processors 12B, one or more chipsets 15B, memory 21B, and/or NIC 304. When so accessed and executed, these one or more machine-readable instructions may result in performance of the operations that are described herein as being performed in and/or by circuitry 118C, the components of circuitry 118C, and/or one or more nodes 108. Also, when so accessed and executed, this may result, at least in part, in one or more OS 31B becoming resident in memory 21B and/or being executed, at least in part, by one or more host processors 12B.

OS 31B and OS 31A (and/or respective processes executed by circuitry 118B and 118A) may be identical in function, construction, and/or operation to each other, at least in part. Alternatively or additionally, OS 31B and OS 31A (and/or these respective processes) may be different, at least in part, from each other in function, construction, and/or operation. Accordingly, the respective instructions 205 that may be executed by circuitry 118A and 118B may be identical, at least in part, to each other, or different, at least in part, from each other.

Returning to FIG. 1, in operation of network 100, circuitry 118B may generate, at least in part, one or more messages 116 to announce that one or more nodes 106 that comprise, at least in part, circuitry 118B (1) are requesting, at least in part, that one or more transmissions 122 to one or more nodes 106 be postponed, at least in part, and/or (2) are entering, at least in part after issuance of the one or more messages 116, a relatively lower power state L (e.g., relative to a relatively higher power state H). Also in operation of network 100, in response, at least in part, to one or more messages 116, circuitry 118C may postpone, at least in part, one or more transmissions 122 from one or more nodes 108 to one or more nodes 106.

For example, after and/or in response, at least in part, to one or more nodes 106 (and/or one or more components of one or more nodes 106) have entered an idle state, circuitry 118B may generate and/or issue, at least in part, one or more frames 120 that may comprise, at least in part, one or more messages 116 that may be destined for receipt, at least in part, by one or more nodes 108. In this embodiment, an entity may be in idle state or idle condition if the amount of meaningful processing and/or work performed by the entity falls below a threshold for a certain amount of time. In this embodiment, this threshold and/or amount of time may be set (e.g., by a user via a not shown user interface and/or application process) and/or may be preset, at least in part. The generation and/or issuance, at least in part, of one or more frames 120 and/or one or more messages 116 by circuitry 118B may occur, at least in part, at or contemporaneously with time TA, at which time TA, one or more nodes 106 (and/or one or more components thereof) may be operating in the relatively higher power state H in which one or more nodes 106 (and/or one or more components thereof) may be fully powered-up and/or fully operational. After and/or contemporaneously, at least in part, with this generation and/or issuance of one or more frames 120 and/or one or more messages 116, circuitry 118B, one or more nodes 106, and/or one or more components thereof, may enter and/or operate in, at least in part, the relatively lower power state L. Thereafter, circuitry 118B, one or more nodes 106, and/or one or more components thereof, may remain and/or operate in, at least in part, this relatively lower power state L, until time TB. While operating in this relatively lower power state L, circuitry 118B, one or more nodes 106, and/or one or more components thereof, may be at least partially powered-down relative to the fully operational power state H. At and/or contemporaneously with time TB, circuitry 118B, one or more nodes 106, and/or one or more components thereof, may return to and/or operate in, at least in part, the relatively higher power state H.

In response, at least in part, to receiving, at least in part, one or more messages 116 and/or one or more frames 120, circuitry 118C may postpone, at least in part, one or more transmissions 122 until after a time period (hereinafter referred to by the variable "P") has elapsed. In this embodiment, time period P may be equal to TB minus TA (i.e., TB−TA). This time period may be determined, at least in part, based at least in part upon one or more of the following: (1) one or more values 126 that may be comprised, at least in part, in one or more messages 116, (2) one or more other values 132 that may be comprised, at least in part, in one or more other messages 130, and/or (3) one or more administrator/user and/or application process preset values 140. For example, as generated and/or issued, at least in part, by circuitry 118B, one or more messages 116 may comprise, at least in part, one or more values 126 that may indicate, at least in part, time period P, either explicitly (e.g., by expressly specifying time period P) and/or by implication (e.g., by specifying time TB).

Also, for example, additionally or alternatively, in this embodiment, subsequent to, contemporaneously with, and/or prior to, at least in part, generating and/or issuing, at least in part, one or more messages 116 and/or one or more frames 120, circuitry 118B may generate and/or issue, at least in part, one or more other messages 130 and/or one or more other frames 128 that may comprise, at least in part, one or more other values 132. One or more values 132 may indicate, at least in part, time period, either explicitly (e.g., by expressly specifying time period P) and/or by implication (e.g., by specifying time TB). If circuitry 118B generates and/or issues, at least in part, one or more messages 130 and/or one or more frames 128, one or more values 126 may indicate, at least in part, that time period P is indicated, at least in part, in one or more values 132 in one or more messages 130.

Additionally or alternatively, time period P may be determined, at least in part, by circuitry 118B and/or circuitry 118C, based at least in part upon one or more preset values 140. These one or more values 140 may be preprogrammed (e.g., by a human user and/or application program) and/or may be communicated to circuitry 118B and/or circuitry 118C via one or more administrative communication messages (not shown) and/or via negotiation employing one or more negotiation exchanges (not shown) between circuitry 118B and/or circuitry 118C. In response, at least in part, to one or more messages 116 and/or 130, and/or one or more frames 120 and/or 128, circuitry 118C may buffer (e.g., in buffer memory 306 in FIG. 3, and/or in memory 21B, e.g., as a result, at least in part of not scheduling for transmission one or more transmission 122), at least in part, until after time period P has elapsed, one or more transmissions 122. After time period P has elapsed, circuitry 118C may transmit, at least in part, one or more transmissions 122 to one or more nodes 106 and/or circuitry 118B, via one or more nodes 104 and/or circuitry 118A.

After being issued, at least in part, by circuitry 118B, one or more messages 116 and/or 130, and/or one or more frames 120 and/or 128, may be received, at least in part, by circuitry 118A and/or one or more nodes 104. One or more nodes 104 and/or circuitry 118A may forward, at least in part, one or more messages 116 and/or 130, and/or one or more frames 120 and/or 128 to one or more nodes 110 and/or 108, and/or to circuitry 118D and/or 118C.

Alternatively or additionally, in this embodiment, one or more transmissions 122 may comprise, at least in part, one or more packets 124 that may have originated, at least in part, from outside the subnet 102 in which one or more nodes 106 and/or 104 may reside. For example, one or more transmissions 122 and/or one or more packets 124 may originate (e.g., as an ultimate and/or intermediate source), at least in part, from one or more nodes 112 in external network 114. In this case, in response, at least in part, to one or more frames 120 and/or one or more messages 116, circuitry 118A that may be comprised, at least in part, in intermediate node 104 that may be comprised, at least in part, in subnet 102, may buffer (e.g., in a not shown buffer memory that may be comprised in circuitry 118A), at least in part, one or more packets 124 and/or one or more transmissions 122 until after time period P has elapsed. This may postpone, at least in part, one or more transmissions 122 until after time period P has elapsed. After time period P has elapsed, circuitry 118A and/or one or more nodes 104 may forward, at least in part, one or more packets 124 and/or one or more transmissions 122 to one or more nodes 106 and/or circuitry 118B. Circuitry 118A may determine, at least in part, time period P based at least in part upon one or more values 126 and/or 132 in a manner that may be analogous to the manner in which circuitry 118C may determine, at least in part, time period P.

Further alternatively or additionally, in this embodiment, if one or more transmissions 122 comprise, at least in part, one or more packets 124 that may have originated, at least in part, from outside the subnet 102, in response, at least in part, to one or more frames 120 and/or one or more messages 116, circuitry 118D that may be comprised, at least in part, in intermediate node 110 that may be outside, at least in part, subnet 102, may buffer (e.g., in a not shown buffer memory that may be comprised in circuitry 118D), at least in part, one or more packets 124 and/or one or more transmissions 122 until after time period P has elapsed. This may postpone, at least in part, one or more transmissions 122 until after time period P has elapsed. After time period P has elapsed, circuitry 118D and/or one or more nodes 110 may forward, at least in part, one or more packets 124 and/or one or more transmissions 122 to one or more nodes 104 and/or circuitry 118A. Circuitry 118A and/or one or more nodes 104 may forward, at least in part, one or more packets 124 and/or one or more transmissions 122 to one or more nodes 106 and/or circuitry 118B. Circuitry 118D may determine, at least in part, time period P based at least in part upon one or more values 126 and/or 132 in a manner that may be analogous to the manner in which circuitry 118C may determine, at least in part, time period P.

In this embodiment, the respective NIC that may be comprised the respective circuitry 118A, 118B, 118C, and/or 118D (e.g., NIC 204 and/or 304 in circuitry 118B and/or circuitry 118C, respectively) may be capable of performing some or all of the operations described above as being performed by circuitry 118A, 118B, 118C, and/or 118D, independently of operating system and/or host processor involvement. For example, in the case of NIC 204, NIC 204 may be capable of generating and/or issuing, at least in part, one or more messages 116 and/or 130, and/or one or more frames 120 and/or 128 without any (or alternatively, substantially meaningful) involvement of, interaction with, and/or control by operating system 31A and/or host processor 12A. Also, for example, in the case of NIC 304, NIC 304 may be capable of receiving and/or processing, at least in part, one or more messages 116 and/or 130, and/or one or more frames 120 and/or 128, without any (or alternatively, substantially meaningful) involvement of, interaction with, and/or control by operating system 31A and/or host processor 12A. Additionally or alternatively, in the case of NIC 304, NIC 304 may be capable of postponing and/or buffering, at least in part, one or more transmissions 122, in response at least in part to one or more messages 116 and/or 130, and/or one or more frames 120 and/or 128, without any (or alternatively, substantially meaningful) involvement of, interaction with, and/or control by operating system 31A and/or host processor 12A.

Figure 4:
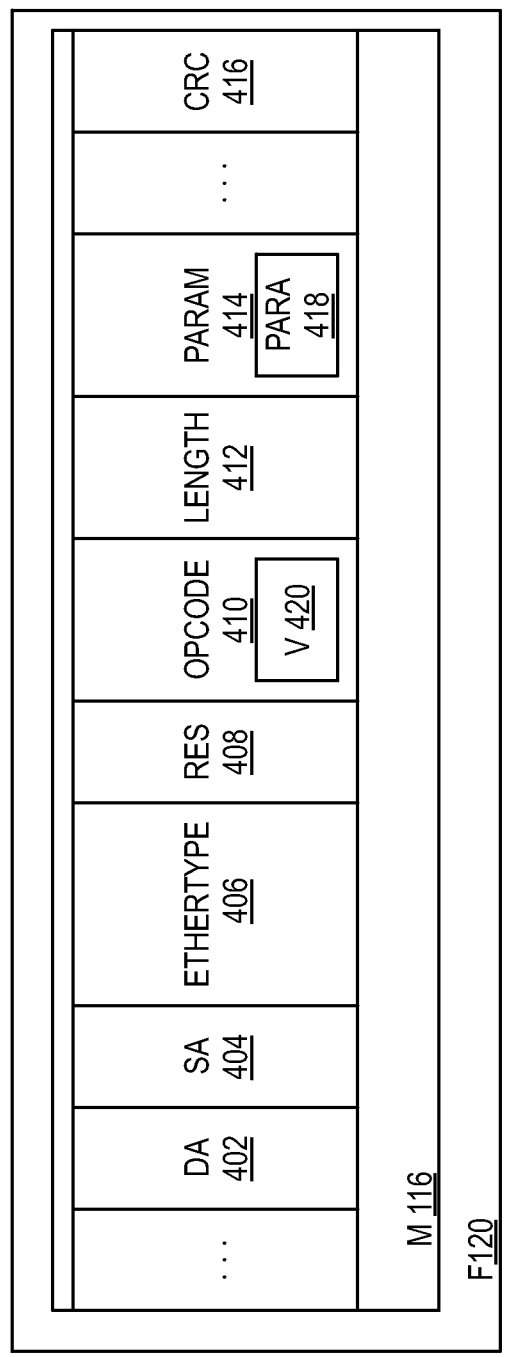
FIG. 4 illustrates embodiment features.

Turning now to FIG. 4, in this embodiment, one or more frames 120 may be or comprise one or more Ethernet and/or TCP/IP protocol compatible frames. One or more frames 120 and/or one or more messages 116 may comprise a plurality of fields. These fields may comprise at least fields 402, 404, 406, 408, 410, 412, 414, and/or 416. One or more fields 402 may be or comprise one or more destination medium access control (MAC) address fields that may indicate, at least in part, as one or more destinations of one or more frames 120 and/or one or more messages 116, one or more nodes 108, circuitry 118C, and/or one or more portions/components thereof. Alternatively or additionally, one or more destination MAC address fields 402 may indicate, at least in part, one or more broadcast and/or multicast MAC addresses that may address (e.g., as destinations of one or more frames 120 and/or one or more messages 116) at least a subset of the stations (e.g., nodes and/or portions/components thereof) that may reside in broadcast domain 102. One or more fields 404 may be or comprise one or more source MAC address fields that may indicate, at least in part, as one or more sources (e.g., circuitry 118B, one or more nodes 106, and/or one or more portions/components thereof) of one or more frames 120 and/or one or more messages 116.

One or more fields 406 may be or comprise one or more ETHERTYPE fields that may indicate (e.g., to one or more nodes 108, 104, and/or 110, and/or to circuitry 118C, 118A, and/or 118D, respectively) that one or more frames 120 and/or one or more messages 116 comprise, at least in part, a special type of message and/or frame (e.g., that may be in a special class to which one or more frames 120 and/or one or more messages 116 may belong). For example, one or more fields 406 may indicate that one or more frames 120 and/or one or more messages 116 belong to a special class of frames and/or messages that may be used, in accordance with this embodiment, in connection, at least in part, with facilitating (1) announcement of entry of one or more nodes into the relatively lower power state L, (2) performance of one or more operations involved and/or comprised, at least in part, in processing to carried out in response, at least in part, to such announcement, (3) postponing, at least in part, one or more transmissions in response, at least in part, to such an announcement, and/or (4) other related processing.

One or more fields 408 may be or comprise, at least in part, one or more reserved fields that may be two bytes in length. One or more fields 408 may be padded with one or more values that may indicate that one or more fields 408 are being reserved for future use. Positioned in between one or more fields 406 and one or more fields 408 may be one or more not shown version fields that may indicate the version of one or more protocols (e.g., Ethernet, TCP, and/or IP protocol) with which one or more frames 120 and/or one or more messages 116 may be compatible. One or more fields 412 may be or comprise one or more length fields that may indicate, at least in part, the length (e.g., size in bytes) of one or more frames 120 and/or one or more messages 116. One or more fields 416 may be comprise one or more cyclical redundancy check (CRC) fields that may contain one or more CRC values calculated based at least in part upon the contents of one or more frames 120 and/or one or more messages 116.

One or more fields 414 may be or comprise one or more parameter fields that may indicate one or more parameters 418 of the one or more messages 116 and/or one or more frames 120. One or more fields 410 may be or comprise one or more opcode fields that may indicate (1) whether one or more parameter fields 414 may be present in one or more frames 120 and/or messages 116 and/or (2) if the one or more parameter fields 414 are present, the particular meaning of the one or more parameters 418.

For example, one or more opcode fields 410 may comprise one or more values 420 that may be selected from a set of values. By way of example, this set of values may comprise values 1 and/or 2 hexadecimal. If one or more values 420 comprise the value 1, this may indicate that (1) one or more parameter fields 414 are present in one or more frames 120 and/or one or more messages 116, and (2) one or more parameters 418 indicate the time period P (e.g., in microseconds) that one or more nodes 106 are to be in the relative lower power state L. In this case, one or more destination address fields 402 may indicate that one or more frames 120 and/or one or more messages 116 are to be multicast and/or broadcast in subnet 102.

Conversely, if one or more values 420 comprise the value 2, this may indicate that the time period P has been preset (e.g., in the manner discussed above and/or stored in memory in respective circuitry 118A, 118B, 118C, and/or 118D). This value also may indicate that (1) one or more parameter fields 414 are present in one or more frames 120 and/or one or more messages 116, and (2) one or more parameters 418 indicate the time period P (e.g., in microseconds) that one or more nodes 106 are to be in the relative lower power state L. Alternatively, this value may indicate that one or more fields 414 are not present in one or more frames 120 and/or one or more messages 116, and that time period P (and/or the end thereof) is indicated in one or more values 132 in one or more frames 128 and/or one or more messages 130, and/or in one or more preset values 140. If one or more values 420 comprise the value 2, one or more destination address fields 402 may indicate that one or more frames 120 and/or one or more messages 116 are to be multicast and/or broadcast in subnet 102.

Figure 5:
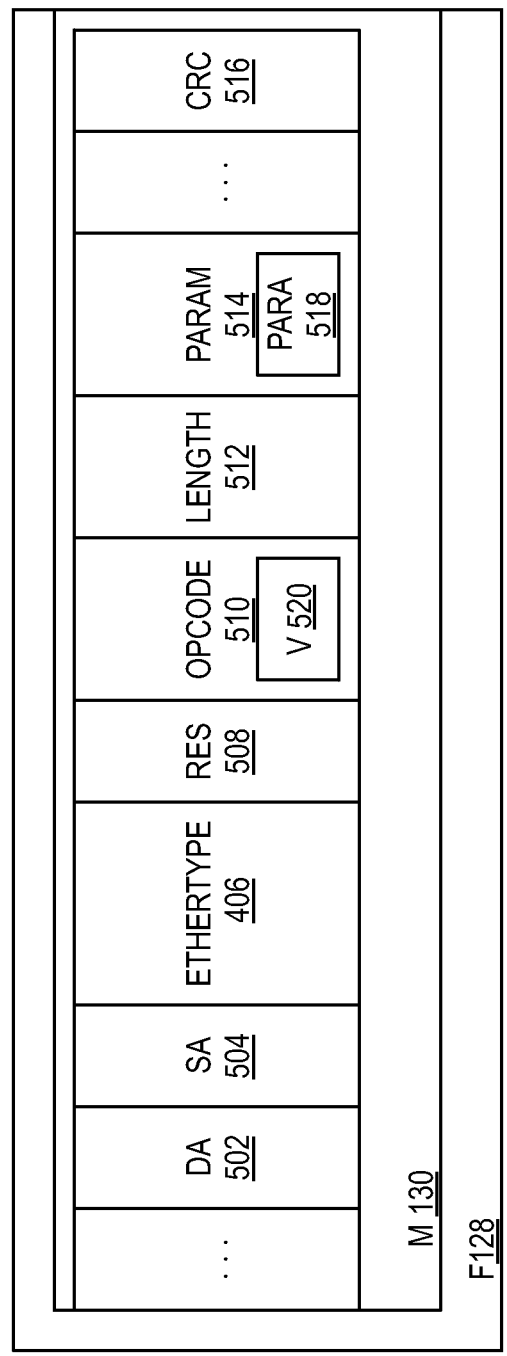
FIG. 5 illustrates embodiment features.

Turning to FIG. 5, in this embodiment, one or more frames 128 may be or comprise one or more Ethernet and/or TCP/IP protocol compatible frames. One or more frames 128 and/or one or more messages 130 may comprise a plurality of fields. These fields may comprise at least fields 502, 504, 506, 508, 510, 512, 514, and/or 516. One or more fields 502 may be or comprise one or more destination MAC address fields that may indicate, at least in part, as one or more destinations of one or more frames 128 and/or one or more messages 130, one or more nodes 106, circuitry 118B, and/or one or more portions/components thereof. Alternatively or additionally, one or more destination MAC address fields 502 may indicate, at least in part, one or more broadcast and/or multicast MAC addresses that may address (e.g., as destinations of one or more frames 128 and/or one or more messages 130) at least a subset of the stations (e.g., nodes and/or portions/components thereof) that may reside in broadcast domain 102. One or more fields 504 may be or comprise one or more source MAC address fields that may indicate, at least in part, as one or more sources (e.g., circuitry 118C, one or more nodes 108, and/or one or more portions/components thereof) of one or more frames 128 and/or one or more messages 130.

One or more fields 506 may be or comprise one or more ETHERTYPE fields that may indicate (e.g., to one or more nodes 106, 104, and/or 110, and/or to circuitry 118B, 118A, and/or 118D, respectively) that one or more frames 128 and/or one or more messages 130 comprise, at least in part, the same special type/class of message and/or frame that one or more frames 120 and/or one or more messages 116 may comprise. For example, one or more fields 506 may comprise, at least in part, one or more analogous and/or identical values to those comprised in one or more fields 406.

One or more fields 508 may be or comprise, at least in part, one or more reserved fields that may be two bytes in length. One or more fields 508 may be padded with one or more values that may indicate that one or more fields 508 are being reserved for future use. Positioned in between one or more fields 506 and one or more fields 508 may be one or more not shown version fields that may indicate the version of one or more protocols (e.g., Ethernet, TCP, and/or IP protocol) with which one or more frames 128 and/or one or more messages 130 may be compatible. One or more fields 512 may be or comprise one or more length fields that may indicate, at least in part, the length (e.g., size in bytes) of one or more frames 128 and/or one or more messages 130. One or more fields 516 may be comprise one or CRC fields that may contain one or more CRC values calculated based at least in part upon the contents of one or more frames 128 and/or one or more messages 130.

One or more fields 514 may be or comprise one or more parameter fields that may indicate one or more parameters 518 of the one or more messages 130 and/or one or more frames 128. One or more fields 510 may be or comprise one or more opcode fields that may indicate (1) whether one or more parameter fields 514 may be present in one or more frames 128 and/or messages 130 and/or (2) if the one or more parameter fields 514 are present, the particular meaning of the one or more parameters 518.

For example, one or more opcode fields 510 may comprise one or more values 520 that may be selected from a set of values. By way of example, this set of values may comprise values 3, 4, and/or 5 hexadecimal. Each of these possibilities is addressed, in turn, below. As stated above in connection with one or more messages 116 in FIG. 4, one or more values 420 in one or more opcode fields 410 may comprise the value 2, and this value may be used to indicate, at least in part, that the end of the time period P (i.e., the return of circuitry 118B, one or more nodes 106, and/or one or more components thereof, to operating in, at least in part, the relatively higher power state H) is to be indicated, at least in part, in one or more values 132 in one or more other frames 128 and/or messages 130. If this is the case, then one or more opcode fields 510 in one or more other frames 128 and/or messages 130 in FIG. 5 may indicate a value of 3. This value may indicate that one or more frames 128 and/or messages 130 indicate to one or more nodes 108 and/or circuitry 118C that the circuitry 118B, one or more nodes 106, and/or one or more components thereof are exiting the relatively lower power state L to return to operating in, at least in part, the relatively higher power state H.

Conversely, if one or more values 520 comprise the value 4, this may indicate that (1) one or more parameters fields 514 are not present in the one or more other frames 128 and/or one or more messages 130, and (2) the one or more other frames 128 and/or one or more messages 130 are being issued from the one or more nodes 108 and/or circuitry 118C to the one or more nodes 106 and/or circuitry 118B to request that the one or more nodes 106 and/or circuitry 118B exit the relatively lower power state L and return to the relatively higher power state H. In this case, this may result, at least in part, from a determination by circuitry 118C and/or one or more nodes 108 that one or more buffers 306 may be approaching maximum fill and/or overflow. Accordingly, in this case, circuitry 118C and/or one or more nodes 108 may generate and/or issue, at least in part, one or more frames 128 and/or one or more messages 130 to request that one or more nodes 106 and/or circuitry 118B exit the relatively lower power state L and return to the relatively higher power state H to permit the one or more transmissions 122 to occur prior to the occurrence of such maximum fill and/or overflow to avoid loss, at least in part, of the one or more transmissions. In this case, one or more destination fields 502 may indicate, at least in part, one or more nodes 106, circuitry 118B, and/or one or more components thereof. Also in this case, one or more source fields 504 may indicate, at least in part, one or more nodes 108, circuitry 118C, and/or one or more components thereof.

Conversely, if one or more values 520 comprise the value 5, this may indicate that (1) one or more parameters fields 514 are present in the one or more other frames 128 and/or one or more messages 130, (2) the one or more parameter fields 514 are to indicate, at least in part, the number of MAC addresses that may be associated with virtual machines of a host issuing the one or more frames 128 and/or one or more messages 130, and/or (3) one or more parameters 518 may indicate, at least in part, these MAC addresses. For example, each of the nodes 106, 104, 108, and/or 110 may comprise one or more respective hosts 602 (see FIG. 6). Under the control, at least in part, of one or more virtual machine managers (VMM) 604, one or more virtual machines 606A . . . 606N may execute, at least in part, in such one or more hosts 602. These virtual machines 606A . . . 606N may be associated with, at least in part, one or more respective MAC addresses 608A . . . 608N. For example, if one or more hosts 602 are comprised, at least in part, in one or more nodes 108, then these MAC addresses 608A . . . 608N may be associated with the virtual machines 606A . . . 606A and/or with the NIC 304 (see FIG. 3). That is, for example, NIC 304 may be addressable using the MAC addresses 608A . . . 608N, and the NIC 304 and/or VMM 604 may associate and/or route frames and/or messages to and/or from the virtual machines 606A . . . 606N based at least in part upon the respective MAC addresses 608A . . . 608N associated with the respective virtual machines 606A . . . 606N. Accordingly, in this example employing one or more nodes 108, one or more nodes 108 and/or circuitry 118C may generate and/or issue, at least in part, one or more frames 128 and/or one or more messages 130 whose one or more values 520 may comprise the value 5, and whose one or more parameters 518 may indicate, at least in part, the number 610 of these MAC addresses 606A . . . 606N and/or a list 612 of the MAC addresses 606A . . . 606N themselves. Additionally or alternatively, the one or more parameters 518 may indicate, at least in part, one or more primary addresses (e.g., source and/or destination addresses) to be used when communicating with one or more nodes 108. In this case, one or more source address fields 502 may correspond, at least in part, to these one or more primary addresses. One or more such frames 128 and/or messages 130 may be multicast and/or broadcast in subnet 102 following, for example, network and/or other topology change of subnet 102, network 100, and/or network 114. Such topology change may comprise, for example, link status change and/or change in the MAC addresses 606A . . . 606N. After receiving one or more such frames 128 and/or messages 130 from one or more nodes 108, other nodes 106, 104, 110, and/or 112 (and/or their respective circuitry) may communicate with one or more nodes 108 via one or more frames and/or messages that may reference as the one or more destination addresses these one or more primary addresses. These other nodes 106, 104, 110, and/or 112, may employ similar and/or analogous processes to multicast and/or broadcast their respective MAC address numbers, MAC address lists, and/or primary addresses. Advantageously, this may reduce network message congestion and/or processing overhead in subnet 102, network 100, and/or network 114.

Of course, many alternatives and/or modifications are possible. For example, one or more frames 120 and/or 128, and/or one or more messages 116 and/or 130, may comprise one or more other and/or additional fields and/or values without departing from this embodiment. Additionally or alternatively, the number and/or sizes of the fields that may be comprised in one or more frames 120 and/or 128, and/or one or more messages 116 and/or 130 may vary without departing from this embodiment.

Thus, an embodiment may include circuitry that may be capable of performing operations that may include generating, at least in part, at least one message to announce that at least one network node (1) is requesting, at least in part, that one or more transmissions to the at least one network node be postponed, at least in part, and/or (2) is entering, at least in part after issuance of the at least one message, a relatively lower power state relative to a relatively higher power state. Additionally or alternatively, the operations may include, in response, at least in part, to the at least one message, postponing, at least in part, (e.g., at one or more intermediate nodes) at least one transmission (e.g., received at the one or more intermediate nodes) to the at least one network node.

Advantageously, this embodiment may permit end-to-end coordination of entry to and/or exit from relatively lower power states of the nodes in a network. Advantageously, this may permit the nodes to be able to enter and/or remain for longer periods in much lower power states than other may be practicable, without substantial risk of network data loss. Further advantageously, in this embodiment, packets (e.g., from outside of the local segment) may be buffered in one or more intermediate nodes 104 and/or proxies 110. This may consolidate and/or reduce the buffer space that may be employed for such purposes in the network 100 and/or subnet 102. This may reduce the die sizes of the buffer memories that may be employed. Yet further advantageously, this and/or other features of this embodiment may reduce the power consumed and/or heat dissipated by the network nodes and/or the network. Also advantageously, these and/or other features of this embodiment may result in reduction in the total cost of producing and/or operating the nodes and/or network.

Many other and/or additional modifications, variations, and/or alternatives are possible without departing from this embodiment. For example, in order to simplify per packet switching issues, the respective lists of MAC addresses and/or related information may be provided in and/or as a result of, at least in part, one or more negotiations and/or exchanges between and/or among one or more intermediate nodes 104 and/or 110, and/or one or more of the other nodes 106, 108, and/or 112.

Additionally or alternatively, if network services (e.g., one or more webservers) and their related support services (e.g., one or more backend data servers) are comprised in subnet 102, this embodiment may advantageously permit these services to enter and/or exit respective lower power states in coordination, at least in part, with the entry into and/or exit from the respective lower power states of clients that may use these services.

Many other and/or additional modifications are possible. For example, each of the nodes 106, 104, 108, 110, and/or 112 may comprise a respective plurality of nodes. Also, for example, the proxy node 110 may be comprised, at least in part, in the subnet 102.

Additionally or alternatively, the respective NIC 204, 304 in the circuitry 118B, 118C may be capable of functioning, at least in part, as respective proxy agents (and/or in accordance with a proxy protocol) for the respective host processors 12A, 12B when the respective nodes 106, 108 that may comprise them may be in relatively lower power states. When so functioning, various host processor functions may be offloaded to the respective NIC 204, 304 such that the respective NIC 204, 304 may be capable of processing one or more received packets despite the respective nodes 106, 108 being in these relatively lower power states. Accordingly, in this situation, such packets may not be buffered, but instead, may be transmitted to the nodes 106, 108 to be processed, at least in part, by the respective NIC 204, 304.

Additionally or alternatively, for example, prior to entry into the relatively lower power state, the host processor 12A may notify NIC 204 that it is entering this state. Thereafter, the host processor 12A may enter an intermediate lower power state, and NIC 204 may transmit one or more broadcast messages (e.g., a broadcast of messages 116) announcing, at least in part, entry into this state. Such broadcast messages may be sent multiple times (e.g., a complete broadcast of such messages may be followed one or more subsequent complete broadcasts of such messages). Prior to completion of these operations and/or while these operations are occurring, if one or more packets are received by NIC 204 from one or more of the other nodes, the host processor 12A may re-enter the fully powered-up state from this intermediate state to prevent data loss. Conversely, if a worse case round trip packet travel time elapses and no such packets are received by NIC 204, host processor 12A may enter an even lower (e.g., lowest) power state without being in fully powered-off condition. This round trip travel time may be set by, for example, an administrator and/or an application program associated with the network.

Also additionally or alternatively, after a packet is received by switch 104, the switch 104 may transmit to the node 106 that is in the relatively lower power state one or more messages indicating that the node 106 is to return to a relatively higher power state, and the switch 104 may buffer incoming packets that may be intended for the node 106 for so long as it may take the node 106 to enter the intermediate lower power state. This time may be less than time period P and less than the time involved in returning to the fully powered-up state. The NIC 204 in the node 106 may buffer received packets after the switch 104 is no longer buffering such incoming packets. The above process also may obtain for another node (e.g., node 108) other than switch 104.

Additionally or alternatively, if multiple messages (each with one or more opcodes) are contained in a single frame 120, then the frame 120 may comprise multiple sequences of one or more opcodes followed by a length field followed by one or more parameters. For example, if two such sequences are comprised in frame 120, then they may be as follows: opcode 1|length 1|parameter(s) 1|opcode 2|length 2|parameter(s) 2. In this situation, the length 1 may indicate the length of the first command (e.g., comprising opcode 1, length 1, and parameter(s) 1), and the length 2 may indicate the length of the second command (e.g., comprising opcode 2, length 2, and parameter(s) 2).

Additionally or alternatively, in the event that one or more changes to the VM 606A . . . 606N and/or associated MAC addresses occurs (e.g., as a result of terminating and/or beginning execution of one or more respective VM), one or more additional messages may be exchanged that may update the MAC addresses, number of MAC addresses, etc. in host 602 to reflect these one or more changes. Also additionally or alternatively, depending upon the particular implementation of network 100, one or more of the nodes in the network 100 may be associated with one or more not shown virtual local area networks (VLAN). In this situation, the MAC addresses 608A . . . 608N may be or comprise VLAN MAC addresses, and/or the list 612 may comprise such VLAN MAC addresses. Unicast cases may be announced, at least in part, using list 612 via one or more control messages. However, if multicast messages are employed, in this VLAN arrangement, a receiving NIC may buffer a received message and request that its associated host processor return to its fully powered-on state after a threshold time has elapsed. Such multicast messages may not be buffered prior to transmission in the network 110 in order not to prevent other intended recipients from receiving the multicast message.

Further additionally or alternatively, it may be possible that when a node (e.g., node 106) transmits one or more messages 116, one or more other nodes (e.g., node 108) may be in a relatively lower power state. In this case, circuitry 118C and/or NIC 304 may be capable of receiving and/or processing the one or more messages 116 (e.g., by determining that one or more messages 116 comprise the special ETHERTYPE, and therefore, should be processed despite the relatively lower power state). Alternatively or additionally, one or more nodes (e.g., node 104) may be capable of buffering, and thereafter, relaying the one or more messages 116 in response to one or more messages 130 announcing the return of the one or more nodes 108 to the relatively higher power state. Accordingly, this embodiment should be viewed broadly as encompassing all such alternatives, modifications, and variations.

What is claimed is:

1. An apparatus comprising:
circuitry capable of performing operations that comprise at least one of the following subparagraphs (a) and (b):
  (a) generating, at least in part, at least one message to announce that at least one network node is at least one of:
    requesting, at least in part, that at least one transmission to the at least one network node be postponed, at least in part; and
    entering, at least in part after issuance of the at least one message, a relatively lower power state relative to a relatively higher power state; and
  (b) in response, at least in part, to the at least one message, postponing, at least in part, at an intermediate node the at least one transmission to the at least one network node, the intermediate node being to receive the at least one transmission;
wherein:
  the circuitry is comprised, at least in part, in at least one of the at least one network node and the intermediate node;
  each of the at least one network node and the intermediate node comprises a respective host processor and is capable of executing a respective operating system;
  the circuitry that is comprised, at least in part, in the at least one network node is capable of performing the operations independently of interaction with and control by the respective operating system and respective host processor of the at least one network node;
  the circuitry that is comprised, at least in part, in the intermediate node is capable of performing the operations independently of interaction with and control by the respective operating system and respective host processor of the intermediate node;
  the at least one network node and the intermediate node are to be comprised in a subnet, the subnet is to comprise web server-based network services and related backend data server-based support services, and the circuitry is capable of permitting coordination, at least in part, of respective entry into and respective exit from respective power states of the web server-based network services and related backend data server-based support services with respective entry into and respective exit from respective power states of clients of the web server-based network services and the related backend data server-based support services;
  the at least one message is to be broadcast multiple times;
  after a worst case network packet round trip travel time elapses, following broadcasting of the at least one message, in which no packet is received by the at least one network node, the respective host processor of the at least one network node is to enter a non-powered down, lowest possible power state of the respective host processor of the at least one network node;

the worst case network packet round trip travel time is to be set by a network-associated application program.

2. The apparatus of claim 1, wherein;
in response, at least in part, to the at least one message, the circuitry is to postpone, at least in part, the at least one transmission until after a time period has elapsed; and
the time period is determined, at least in part, based at least in part upon one or more of the following:
one or more values comprised in the at least one message;
one or more other values comprised in at least one other message; and
one or more user preset values.

3. The apparatus of claim 2, wherein:
in response, at least in part, to the at least one message, the circuitry is to buffer, at least in part, until after the time period has elapsed, the at least one transmission;
the at least one transmission comprises at least one packet that originated from outside the subnet in which the at least one network node resides; and
the circuitry is comprised, at least in part, in the intermediate node, and the intermediate node is comprised, at least in part, in the subnet.

4. The apparatus of claim 3, wherein:
the subnet corresponds to a broadcast domain of the at least one message; the intermediate node comprises at least one of: a proxy node; and a switch; and
the proxy node is outside, at least in part, the subnet.

5. The apparatus of claim 1, wherein:
the relatively higher power state comprises a fully operational state of the at least one network node;
when the at least one network node is in the relatively lower power state, the at least one network node is non-operational, at least in part, compared to the fully operational state; and the circuitry comprises, at least in part, a network interface controller to perform the subparagraphs (a) and (b) independently of operating system involvement.

6. The apparatus of claim 1, wherein:
the at least one network node resides in the subnet;
the at least one message is comprised, at least in part, in at least one Ethernet protocol compatible frame, the at least one frame comprising at least the following fields:
destination medium access control (MAC) address field that indicates, at least in part, at least one other network node in the subnet;
source MAC address field that indicates the at least one network node; an ETHERTYPE field indicating to the at least one other network node that the at least one frame comprises, at least in part, a message type that is in a class to which the at least one message belongs;
at least one parameter field to indicate at least one parameter of the at least one message; and
at least one opcode field to indicate whether at least one parameter field is present in the at least one frame, and if the at least one parameter field is present, the opcode field also to indicate meaning of the at least one parameter.

7. The apparatus of claim 6, wherein:
the at least one opcode field comprises at least one value selected from a set of values, the set of values comprising values to indicate the following subparagraphs (c) to (f):
(c) the at least one parameter field is present in the at least one frame, and the at least one parameter is to indicate a time period in which the at least one network node is to be in the relatively lower power state;
(d) the at least one parameter field is not present in the at least one frame, and the time period is to be communicated via another frame;
(e) the at least one parameter field is not present in the at least one frame, and the time period is administrator preset; and
(f) the at least one parameter field is not present in the at least one frame, and return to the relatively higher power state by the at least one network node is to be indicated, at least in part, by another message.

8. The apparatus of claim 1, wherein:
at least one Ethernet compatible frame comprises the at least one message, the at least one frame comprising an ETHERTYPE field that indicates that the at least one frame comprises, at least in part, a message type that is in a class to which the at least one message belongs;
the circuitry is also to perform other operations comprising at least one of the following subparagraphs (c) and (d):
(c) generate, at least in part, at least one other Ethernet compatible frame that comprises the ETHERTYPE field, at least one parameter field to indicate at least one parameter of the at least one other frame, and at least one opcode field to indicate whether at least one parameter field is present in the at least one other frame, and if the at least one parameter field is present, the opcode field also to indicate meaning of the at least one parameter; and
(d) receive, at least in part, the at least one other frame.

9. The apparatus of claim 8, wherein:
the at least one opcode field comprises at least one value selected from a set of values, the set of values comprising values to indicate the following subparagraphs (e) to (g):
(e) the at least one parameter field is present in the at least one other frame, and the at least one parameter is to indicate a number of medium access control (MAC) addresses associated with virtual machines of a host issuing the at least one other frame, the at least one parameter also indicating the MAC addresses;
(f) the at least one parameter field is not present in the at least one other frame, and the at least one other frame is to indicate to at least one other network node that the at least one network node is exiting the relatively lower power state; and
(g) the at least one parameter field is not present in the at least one other frame, and the least one other frame is issued from the at least one other network node to the at least one network node to request that the at least one network node exit the relatively lower power state.

10. A non-transitory Computer-readable memory storing one or more instructions that when executed by a machine results in circuitry performing operations comprising at least one of the following subparagraphs (a) and (b);
(a) generating, at least in part, at least one message to announce that at least one network node is at least one of:
requesting, at least in part, that at least one transmission to the at least one network node be postponed, at least in part; and entering, at least in part after issuance of the at least one message, a relatively lower power state relative to a relatively higher power state; and (b) in response, at least in part, to the at least one message, postponing, at least in part, at an intermediate node the at least one transmission to the at least one network node, the intermediate node being to receive the at least one transmission;

wherein:

the circuitry is comprised, at least in part, in at least one of the at least one network node and the intermediate node;

each of the at least one network node and the intermediate node comprises a respective host processor and is capable of executing a respective operating system;

the circuitry that is comprised, at least in part, in the at least one network node is capable of performing the operations independently of interaction with and control by the respective operating system and respective host processor of the at least one network node;

the circuitry that is comprised, at least in part, in the intermediate node is capable of performing the operations independently of interaction with and control by the respective operating system and respective host processor of the intermediate node;

the at least one network node and the intermediate node are to be comprised in a subnet, the subnet is to comprise web server-based network services and related backend data server-based support services, and the circuitry is capable of permitting coordination, at least in part, of respective entry into and respective exit from respective power states of the web server-based network services and related backend data server-based support services with respective entry into and respective exit from respective power states of clients of the web server-based network services and the related backend data server-based support services;

the at least one message is to be broadcast multiple times;

after a worst case network packet round trip travel time elapses, following broadcasting of the at least one message, in which no packet is received by the at least one network node, the respective host processor of the at least one network node is to enter a non-powered down, lowest possible power state of the respective host processor of the at least one network node;

the worst case network packet round trip travel time is to be set by a network-associated application program.

11. The non-transitory computer-readable memory of claim 10, wherein:

in response, at least in part, to the at least one message, the circuitry is to postpone, at least in part, the at least one transmission until after a time period has elapsed; and the time period is determined; at least in part, based at least in part upon one or more of the following:

one or more values comprised in the at least one message;
one or more other values comprised in at least one other message; and
one or more user preset values.

12. The non-transitory computer-readable memory of claim 11, wherein:

in response, at least in part, to the at least one message, the circuitry is to buffer, at least in part, until after the time period has elapsed, the at least one transmission;

the at least one transmission comprises at least one packet that originated from outside the subnet in which the at least one network node resides; and the circuitry is comprised, at least in part, in the intermediate node, and the intermediate node is comprised, at least in part, in the subnet.

13. The non-transitory computer-readable memory of claim 12, wherein:

the subnet corresponds to a broadcast domain of the at least one message; the intermediate node comprises at least one of: a proxy node; and a switch; and the proxy node is outside, at least in part, the subnet.

14. The non-transitory computer-readable memory of claim 10, wherein:

the relatively higher power state comprises a fully operational state of the at least one network node;

when the at least one network node is in the relatively lower power state, the at least one network node is non-operational, at least in part, compared to the fully operational state; and the circuitry comprises, at least in part, a network interface controller to perform the subparagraphs (a) and (b) independently of operating system involvement.

15. The non-transitory computer-readable memory of claim 10, wherein:

the at least one network node resides in the subnet; the at least one message is comprised, at least in part, in at least one Ethernet protocol compatible frame, the at least one frame comprising at least the following fields:

destination medium access control (MAC) address field that indicates, at least in part; at least one other network node in the subnet;

source MAC address field that indicates the at least one network node; an ETHERTYPE field indicating to the at least one other network node that the at least one frame comprises, at least in part, a message type that is in a class to which the at least one message belongs;

at least one parameter field to indicate at least one parameter of the at least one message; and at least one opcode field to indicate whether at least one parameter field is present in the at least one frame, and if the at least one parameter field is present, the opcode field also to indicate meaning of the at least one parameter.

16. The non-transitory computer-readable memory of claim 15, wherein;

the at least one opcode field comprises at least one value selected from a set of values, the set of values comprising values to indicate the following subparagraphs (c) to (f):

(c) the at least one parameter field is present in the at least one frame, and the at least one parameter is to indicate a time period in which the at least one network node is to be in the relatively lower power state;

(d) the at least one parameter field is not present in the at least one frame, and the time period is to be communicated via another frame;

(e) the at least one parameter field is not present in the at least one frame, and the time period is administrator preset; and (f) the at least one parameter field is not present in the at least one frame, and return to the relatively higher power state by the at least one network node is to be indicated, at least in part, by another message.

17. The non-transitory computer-readable memory of claim 10, wherein:
at least one Ethernet compatible frame comprises the at least one message, the at least one frame comprising an ETHERTYPE field that indicates that the at least one frame comprises, at least in part, a message type that is in a class to which the at least one message belongs;
the circuitry is also to perform other operations comprising at least one of the following subparagraphs (c) and (d):
(c) generate, at least in part, at least one other Ethernet compatible frame that comprises the ETHERTYPE field, at least one parameter field to indicate at least one parameter of the at least one other frame, and at least one opcode field to indicate whether at least one parameter field is present in the at least one other frame, and if the at least one parameter field is present, the opcode field also to indicate meaning of the at least one parameter; and
(d) receive, at least in part, the at least one other frame.

18. The non-transitory computer-readable memory of claim 17, wherein:
the at least one opcode field comprises at least one value selected from a set of values, the set of values comprising values to indicate the following subparagraphs (e) to (g):
(e) the at least one parameter field is present in the at least one other frame, and the at least one parameter is to indicate a number of medium access control (MAC) addresses associated with virtual machines of a host issuing the at least one other frame, the at least one parameter also indicating the MAC addresses;
(f) the at least one parameter field is not present in the at least one other frame, and the at least one other frame is to indicate to at least one other network node that the at least one network node is exiting the relatively lower power state; and
(g) the at least one parameter field is not present in the at least one other frame, and the least one other frame is issued from the at least one other network node to the at least one network node to request that the at least one network node exit the relatively lower power state.

19. The non-transitory computer-readable memory of claim 10, wherein:
the at least one transmission comprises at least one packet that originated from outside the subnet in which the at least one network node resides; and
the circuitry is comprised, at least in part, in an intermediate node that is comprised; at least in part, in the subnet;
the subnet corresponds to a broadcast domain of the at least one message; the intermediate node comprises at least one of: a proxy node; and a switch;
the proxy node is comprised, at least in part, in the subnet; and
the at least one network node comprises a plurality of network nodes that reside at least in part in the subnet.

20. The non-transitory computer-readable memory of claim 19, wherein:
the MAC addresses are comprised, at least in part, in a list of MAC addresses;
and the MAC addresses comprise one or more virtual local area network (VLAN) MAC addresses.

21. A method that uses circuitry to perform operations comprising at least one of the following subparagraphs (a) and (b):
(a) generating, at least in part, at least one message to announce that at least one network node is at least one of:
requesting, at least in part, that at least one transmission to the at least one network node be postponed, at least in part; and
entering, at least in part after issuance of the at least one message, a relatively lower power state relative to a relatively higher power state; and
(b) in response, at least in part, to the at least one message, postponing, at least in part, at an intermediate node the at least one transmission to the at least one network node, the intermediate node being to receive the at least one transmission;
wherein:
the circuitry is comprised, at least in part, in at least one of the at least one network node and the intermediate node;
each of the at least one network node and the intermediate node comprises a respective host processor and is capable of executing a respective operating system;
the circuitry that is comprised, at least in part, in the at least one network node is capable of performing the operations independently of interaction with and control by the respective operating system and respective host processor of the at least one network node;
the circuitry that is comprised, at least in part, in the intermediate node is capable of performing the operations independently of interaction with and control by the respective operating system and respective host processor of the intermediate node;
the at least one network node and the intermediate node are to be comprised in a subnet, the subnet is to comprise web server-based network services and related backend data server-based support services, and the circuitry is capable of permitting coordination; at least in part, of respective entry into and respective exit from respective power states of the web server-based network services and related backend data server-based support services with respective entry into and respective exit from respective power states of clients of the web server-based network services and the related backend data server-based support services;
the at least one message is to be broadcast multiple times;
after a worst case network packet round trip travel time elapses, following broadcasting of the at least one message, in which no packet is received by the at least one network node, the respective host processor of the at least one network node is to enter a non-powered down; lowest possible power state of the respective host processor of the at least one network node;
the worst case network packet round trip travel time is to be set by a network-associated application program.

22. The method of claim 21, wherein:
in response, at least in part, to the at least one message, the circuitry is to postpone, at least in part, the at least one transmission until after a time period has elapsed; and
the time period is determined, at least in part, based at least in part upon one or more of the following:
one or more values comprised in the at least one message;
one or more other values comprised in at least one other message; and
one or more user preset values.

23. The method of claim 22, wherein:
in response, at least in part, to the at least one message, the circuitry is to buffer, at least in part, until after the time period has elapsed, the at least one transmission;
the at least one transmission comprises at least one packet that originated from outside the subnet in which the at least one network node resides; and
the circuitry is comprised, at least in part, in the intermediate node, and the intermediate node is comprised, at least in part, in the subnet.

24. The method of claim 23, wherein:
the subnet corresponds to a broadcast domain of the at least one message; the intermediate node comprises at least one of: a proxy node; and a switch; and
the proxy node is outside, at least in part, the subnet.

25. The method of claim 21, wherein:
the relatively higher power state comprises a fully operational state of the at least one network node;
when the at least one network node is in the relatively lower power state, the at least one network node is non-operational, at least in part, compared to the fully operational state; and the circuitry comprises, at least in part, a network interface controller to perform the subparagraphs (a) and (b) independently of operating system involvement.

26. The method of claim 21, wherein:
the at least one network node resides in the subnet;
the at least one message is comprised, at least in part, in at least one Ethernet protocol compatible frame, the at least one frame comprising at least the following fields:
 destination medium access control (MAC) address field that indicates; at least in part, at least one other network node in the subnet;
 source MAC address field that indicates the at least one network node; an ETHERTYPE field indicating to the at least one other network node that the at least one frame comprises, at least in part, a message type that is in a class to which the at least one message belongs;
 at least one parameter field to indicate at least one parameter of the at least one message; and
 at least one opcode field to indicate whether at least one parameter field is present in the at least one frame, and if the at least one parameter field is present, the opcode field also to indicate meaning of the at least one parameter.

27. The method of claim 26, wherein:
the at least one opcode field comprises at least one value selected from a set of values, the set of values comprising values to indicate the following subparagraphs (c) to (f):
 (c) the at least one parameter field is present in the at least one frame, and the at least one parameter is to indicate a time period in which the at least one network node is to be in the relatively lower power state;
 (d) the at least one parameter field is not present in the at least one frame, and the time period is to be communicated via another frame;
 (e) the at least one parameter field is not present in the at least one frame, and the time period is administrator preset; and
 (f) the at least one parameter field is not present in the at least one frame, and return to the relatively higher power state by the at least one network node is to be indicated, at least in part, by another message.

28. The method of claim 21, wherein:
at least one Ethernet compatible frame comprises the at least one message, the at least one frame comprising an ETHERTYPE field that indicates that the at least one frame comprises, at least in part, a message type that is in a class to which the at least one message belongs;
the circuitry is also to perform other operations comprising at least one of the following subparagraphs (c) and (d):
 (c) generate, at least in part, at least one other Ethernet compatible frame that comprises the ETHERTYPE field, at least one parameter field to indicate at least one parameter of the at least one other frame, and at least one opcode field to indicate whether at least one parameter field is present in the at least one other frame, and if the at least one parameter field is present, the opcode field also to indicate meaning of the at least one parameter; and
 (d) receive, at least in part, the at least one other frame.

29. The method of claim 28, wherein:
the at least one opcode field comprises at least one value selected from a set of values, the set of values comprising values to indicate the following subparagraphs (e) to (g):
 (e) the at least one parameter field is present in the at least one other frame, and the at least one parameter is to indicate a number of medium access control (MAC) addresses associated with virtual machines of a host issuing the at least one other frame, the at least one parameter also indicating the MAC addresses;
 (f) the at least one parameter field is not present in the at least one other frame, and the at least one other frame is to indicate to at least one other network node that the at least one network node is exiting the relatively lower power state; and
 (g) the at least one parameter field is not present in the at least one other frame, and the least one other frame is issued from the at least one other network node to the at least one network node to request that the at least one network node exit the relatively lower power state.

* * * * *